United States Patent [19]

Semen et al.

[11] Patent Number: 4,835,207

[45] Date of Patent: May 30, 1989

[54] PRECERAMIC COMPOSITIONS AND CERAMIC PRODUCTS

[75] Inventors: John Semen; John J. Rogers, both of Baton Rouge, La.

[73] Assignee: Ethyl Corporation, Richmond, Va.

[21] Appl. No.: 120,102

[22] Filed: Nov. 13, 1987

[51] Int. Cl.$^4$ ................................................. C08K 3/34
[52] U.S. Cl. ............................ 524/443; 106/287.11; 106/287.12; 501/88; 501/92; 524/442; 524/588
[58] Field of Search ............... 524/442, 443, 588; 501/88, 92; 106/287.11, 287.12

[56] References Cited

U.S. PATENT DOCUMENTS

| | | | |
|---|---|---|---|
| 4,117,057 | 9/1978 | Yajima et al. | 264/63 |
| 4,482,669 | 11/1984 | Seyferth et al. | 524/442 |
| 4,560,526 | 12/1985 | Okumura | 501/88 |
| 4,639,501 | 1/1987 | Seyferth et al. | 501/92 |
| 4,645,807 | 2/1987 | Seyferth et al. | 525/474 |
| 4,650,837 | 3/1987 | Seyferth et al. | 525/478 |
| 4,659,850 | 4/1987 | Saitama et al. | 556/409 |

*Primary Examiner*—Melvyn I. Marquis
*Attorney, Agent, or Firm*—Patricia J. Hogan

[57] ABSTRACT

Low density SiC ceramics having improved bending and specific strengths are prepared by (A) intimately mixing about 50–85% by weight of SiC powder with about 15–50% by weight of a preceramic polysilazane binder, (B) pulverizing the mixture to form particles having a particle size smaller than 105 micrometers, (C) separating from those particles any particles having a particle size larger than about 105 micrometers, (D) molding the resultant composition having a particle size not larger than about 105 micrometers, and (E) pyrolyzing the molded composition in an inert atmosphere to a temperature of about 1200°–1450° C.

In a preferred embodiment of the invention, the preceramic binder is at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

12 Claims, No Drawings

PRECERAMIC COMPOSITIONS AND CERAMIC PRODUCTS

FIELD OF INVENTION

This invention relates to improved silicon carbide (SiC) ceramics, i.e., ceramics composed predominantly of SiC, and to preceramic compositions and processes for preparing them.

BACKGROUND

As disclosed in U.S. Pat. Nos. 4,117,057 (Yajima et al.) and 4,560,526 (Okumura et al.), it is known that ceramics can be prepared from mixtures of SiC powder and a preceramic binder and that the strengths of the ceramics decrease with decreasing density. An unfortunate result of this strength/density relationship is that ceramics having typical densities (i.e., about 2.0–2.5 g/cc) have generally not been obtainable with sufficiently high bending strengths (i.e., at least about 20, preferably at least about 28 kg/mm$^2$) to make them commercially attractive.

A Shin Nisso Kako Co., Ltd. product specification sheet, "SiC Products by PPMC Process," indicates that ceramics having a density of 2.3 g/cc and bending strengths of 20–30 kg/mm$^2$ can be obtained from a mixture of SiC powder, polysilastyrene, and an organic lubricant. However, independent measurements of disc specimens provided by Shin Nisso show the bending strengths of these ceramics to be only about 18–21 kg/mm$^2$ and the specific strengths, i.e., the bending strength/density ratios, to be only about 9.6–11.1 (kg/mm$^2$)/(g/cc). This represents an improvement over the strengths of previously known low density SiC ceramics but not as much of an improvement as might be desired.

U.S. Pat. Nos. 4,482,669 (Seyferth et al. A), 4,645,807 (Seyferth et al. B), 4,650,837 (Seyferth et al. C), and 4,659,850 (Arai et al.) disclose the utility of polysilazanes as preceramic materials, and Seyferth et al. A teach that their polysilazanes are especially useful as binders for ceramic powders such as SiC. SiC ceramics prepared from these SiC powder/polysilazane binder compositions are composed predominantly of SiC, e.g., about 80–90% SiC, with the balance being mostly silicon nitride. Seyferth et al. A do not disclose the typical densities and bending strengths of ceramics made from their preceramic compositions. However, Wiseman, "The Development and Application of Polysilazane Precursors to Ceramics," a Massachusetts Institute of Technology thesis, 1984, shows that these densities were generally about 2.0–2.4 g/cc and the bending strengths were poor. Wiseman shows a recognition, though, of its being desirable to minimize alkali metal contamination and to use preceramic polymers having a sufficiently high molecular weight, or mixtures (such as 80/20 mixtures) of such polymers with lower molecular weight polymers, to maximize strength.

SUMMARY OF INVENTION

An object of this invention is to provide novel preceramic polysilazane compositions capable of forming high strength/low density SiC ceramics.

Another object is to provide processes for preparing such compositions and converting them into high strength/low density SiC ceramics.

A further object is to provide novel high strength/low density SiC ceramics.

These and other objects are attained by (A) intimately mixing about 50–85% by weight of SiC powder with about 15–50% by weight of a preceramic polysilazane binder, (B) pulverizing the mixture to form particles having a particle size smaller than 105 micrometers, i.e., particles which pass through a 105 micrometer sieve, (C) separating from those particles any particles having a particle size larger than about 105 micrometers, i.e., particles which are retained on a 105 micrometer sieve, (D) molding the resultant compositon having a particle size not larger than about 105 micrometers, and (E) pyrolyzing the molded composition in an inert atmosphere to a temperature of about 1200–1450° C.

DETAILED DESCRIPTION

SiC powders that can be employed in the practice of the invention are commercially-available materials that vary from very fine to coarse powders. However, the preferred SiC powders are those which have a particle size of about five micrometers or less, preferably one micrometer or less; and particularly good results have been obtained with SiC powders having a substantially spherical particle shape and mean particle sizes of about 0.2–5.0 micrometers, preferably 0.2–1.0 micrometer. Both alpha-SiC and beta-SiC are utilizable.

The binder that is mixed with the SiC powder is a polysilazane, e.g., the polysilazanes of Seyferth et al. A, B, and C, and Arai et al., the teachings of all of which are incorporated herein in toto by reference. It is preferably a polysilazane of the type taught by Seyferth et al. A, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, or a mixture of such polysilazanes. For example, it may be one or more polysilazanes prepared by reacting methyldichlorosilane with ammonia, treating the ammonolysis product with KH, and quenching the resultant product with methyl iodide or dimethylchlorosilane. The utilizable polysilazanes are solids which are soluble in common organic solvents, such as aliphatic or aromatic hydrocarbons, dialkyl or alicyclic ethers, etc., including solid mixtures of normally solid polysilazanes and normally liquid polysilazanes. The solid, soluble polysilazanes having the higher molecular weights are preferred to permit the use of faster pyrolysis rates.

When good strength retention at elevated temperatures is desired, the polysilazane that is utilized should have an alkali metal content not higher than about 100 ppm, preferably not higher than about 5 ppm. When the polymer as prepared contains more than that amount of alkali metal contaminant, the degree of contamination can be reduced in any suitable manner, such as by filtration of a solution of the polysilazane in an organic solvent.

The amount of polysilazane used is such that the preceramic composition comprises about 50–85% by weight of SiC powder and about 15–50% by weight of binder, preferably about 70–80% by weight of SiC powder and about 20–30% by weight of binder.

If desired, the compositions may be modified by the inclusion of optional ingredients, such as polyisobutenyl succinimides, other dispersing agents, and other additives that have been used in known ceramic molding compositions. For example, one or more lubricants such as higher fatty acids and the esters and amides thereof, higher alcohols, paraffin wax, and low molecular weight polyolefins can be used. When employed, such additives are used in minor amounts, e.g., up to about 5% by weight of dispersing agent or up to about 15% by weight of a lubricant, based on the weight of the remainder of the composition.

The preceramic compositions of the invention are prepared by intimately mixing the SiC powder and binder, pulverizing the mixture to form particles having a particle size smaller than 105 micrometers, as hereinabove defined, and separating from those particles any particles having a particle size larger than about 105 micrometers. Neither the particular manner in which the SiC powder and binder are mixed nor the particular manner in which the particle size is reduced appears to be critical. For example, mills in general are useful for the reduction in particle size. However, it is particularly convenient to conduct the process by dispersing the SiC powder in an organic solvent solution of the binder (e.g., a solution in an aliphatic or aromatic hydrocarbon, such as hexane, toluene, etc., or a dialkyl or alicyclic ether, such as diethyl ether, tetrahydrofuran, etc.), preferably at room temperature, removing the solvent (e.g., by rotary evaporation followed by vacuum distillation), ball milling the resultant chunks of powder/binder, and then sieving to remove any particles having a particle size larger then about 105 micrometers.

Ceramics may be prepared from the preceramic compositions by molding them at a temperature and pressure suitable for the parts being made, usually at a temperature of about 60-225° C. and a pressure of about 6865-343,000 kPa, using any suitable shaping process, such as compression, injection, or transfer molding, or extrusion, and then pyrolyzing the molded composition in an inert atmosphere, such as nitrogen, argon, etc., to a temperature of about 1200°-1450° C., preferably about 1300° C. The time required for the pyrolysis varies with the ultimate pyrolysis temperature, being at least one hour at the preferred pyrolysis temperature of about 1300° C., a shorter time at higher temperatures, and a longer time at lower temperatures. It is particularly useful to pyrolyze the molded composition by (1) heating it to 1300° C. at rates of 60° C./hour from room temperature to 60° C., 30° C./hour from 60° C. to 260° C., 120° C./hour from 260° C. to 1260° C., and 60° C./hour from 1260° C. to 1300° C., maintaining the temperature at 1300° C. for one hour, cooling to 900° C. at a rate of −120° C./hour, and conducting the remainder of the cooling at an ambient rate of (2) heating it to 1400° C. at rates of 60° C./hour from room temperature to 60° C., 15° C./hour from 60° C. to 260° C., 120° C./hour from 260° C. to 1260° C., and 60° C./hour from 1260° C. to 1400° C., maintaining the temperature at 1400° C. for 45 minutes, and cooling to room temperature.

In a preferred embodiment of the invention utilizing compression molding as the shaping process, the ultimate strength of the ceramic is maximized by degassing the preceramic composition by the application of vacuum before and during molding.

When the binder is one of the preferred polysilazanes of Seyferth et al. A, the ultimate strength of the ceramic can also be maximized by aging the ceramic in air at about 1200°-1300° C. This aging may be accomplished by heating the ceramic part in air to a temperature of about 1200°-1300° C. after the aforementioned pyrolysis and cool-down, retaining the part in air at that temperature for about 1-10 hours, and then cooling to room temperature. Alternatively, the green molded composition may be pyrolyzed in an inert atmosphere to 1200°14 1300° C. and held at that temperature in the inert atmosphere for about 1-10 hours, then held at that temperature for an additional 1-10 hours after the introduction of air into the pyrolysis furnace, and finally cooled to room temperature.

Ceramics prepared from the preceramic SiC/-polysilazane compositions of the invention have comparable densities but better bending strengths than ceramics prepared from comparable preceramic compositions having a larger particle size. In fact, the use of the novel preceramic compositions can lead to the formation of SiC ceramics having the previously unattainable combination of a density of about 2.0-2.4 g/cc, a bending strength of at least about 20 kg/mm$^2$, and a specific strength of at least 14 (kg/mm$^2$)/(g/cc)—a combination of properties particularly desirable for aerospace and other demanding and critical structural applications. The fact that this combination of properties in the ceramic can be achieved by the reduction in particle size of the preceramic composition is surprising, and the reason for the beneficial effect of the particle size reduction is not understood.

The following examples are given to illustrate the invention and are not intended as a limitation thereof. In the processes described in these examples, thoroughly-dried equipment, purified raw materials, and an inert atmosphere were used to protect the polysilazanes from attack by water and other substances having active hydrogens during synthesis and storage of the polysilazanes and during processing and storage of the polysilazane-containing materials used to make the SiC ceramics.

EXAMPLE I

Synthesis of Polysilazane A

Part A

A suitable reaction vessel was charged with 14L of anhydrous tetrahydrofuran and cooled to about 0° C., after which 1545g (13.43 mols) of methyldichlorosilane ws cannulated into the vessel, and stirring at about 60 rpm was begun. A slow steady stream of 1058g (62.12 mols) of anhydrous ammonia gas was introduced into the vessel at a flow rate such that the reaction pressure was maintained at or below 405.3 kPa, and the reaction temperature stayed in the range of 0°-10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel which had previously been charged with a suspension of 3.6g (0.089 mol) of KH powder in about 100 mL of anhydrous tetrahydrofuran and chilled to 0° C. to begin the polymerization reaction. The reaction mixture was maintained at 0° C. for about 8 hours and then allowed to warm gradually to about 22° C. After a total of about 26 hours of polymerization at 0°–22° C., the reaction was quenched by adding about 12.6g (0.13 mol) of dimethylchlorosilane to the polymerization solution.

The polymer product was isolated by (1) concentrating the product solution to about 4L volume by trap-to-trap vacuum distillation, (2) centrifuging the concentrated solution to obtain a clear supernatant and a white precipitate, (3) decanting off the supernatant from the precipitate, and (4) flashing off the volatiles from the supernatant by trap-to-trap vacuum distillation to provide a white solid which was designated as Polysilazane A. Proton NMR spectra of the polymer in deuterated chloroform solvent had resonances consistent with those reported in Seyferth et al. A for polysilazane and with a small amount, i.e., 2.4% by weight, of residual tetrahydrofuran. Elemental oxygen by neutron activation was about 0.4%, corrected for residual solvent; and the potassium content was determined by inductively coupled plasma emission spectroscopy to be 360 ppm, based on the weight of polymer.

EXAMPLE II

Synthesis of Polysilazane B

Example I was essentially repeated except that the particulates were removed from the ammonolysis product by ultrafiltration, the amount of KH employed was 0.48 mol %, based on the amount of methyldichlorosilane charged in the ammonolysis reaction, and the total polymerization time at 0°–22° C. was 24 hours. The crude polymer product was dried to remove the solvent, after which the dry residue was redissolved in anhydrous cyclohexane, the cyclohexane solution was filtered, and the filtrate was vacuum dried. The Polysilazane B formed by the process was a solid having a tetrahydrofuran content of 2.2% by weight, a cyclohexane content of about 7%, an elemental oxygen content of 0.2% (corrected for residual solvent), and a potassium content of less than 5 ppm.

EXAMPLE III

Synthesis of Polysilazane C

Example I was essentially repeated except that the particulates were removed from the ammonolysis product by ultrafiltration, the reaction mixture for the polymerization was prepared by adding the KH suspension to the ammonolysis product, the amount of KH employed was 0.6 mol %, based on the amount of methyldichlorosilane charged in the ammonolysis reaction, and the polymerization was conducted entirely at 0° C. for a total of 0.7 hour. The Polysilazane C formed by the process was a viscous liquid having a tetrahydrofuran content of 0.5% by weight, an elemental oxygen content of 0.4% (corrected for residual solvent), and a potassium content of less than 5 ppm.

EXAMPLE IV

Synthesis of Polysilazane D

Example III was repeated to form another viscous liquid which was designated as Polysilazane D. It was not analyzed for impurities.

EXAMPLE V

Synthesis of Polysilazane E

Example III was essentially repeated except that the particulates were removed from the ammonolysis product by centrifugation, and the total polymerization time was only 0.3 hours. The Polysilazane E formed by the process was a viscous liquid having a tetrahydrofuran content of 0.6% by weight, an elemental oxygen content of 0.4% (corrected for residual solvent), and a potassium content of less than 5 ppm.

The following examples describe molding formulations prepared from the polysilazanes of the preceding examples and commercial SiC powders. The SiC powder designated as SiC-1 is a beta-SiC powder having an average particle size of 0.65 micrometer and a specific surface area of 16.7 $m^2/g$, the SiC powder designated as SiC-2 is a beta-SiC powder having an averaqge particle size of 0.27 micrometer and a specific surface area of 20.3 $m^2/g$, and the SiC powder designated as SiC-3 is an alpha-SiC powder having an average particle size of 4.6 micrometers. To facilitate distinguishing formulations of the invention from the formulations shown for comparative purposes, formulations which are coarse ground powders are designated simply by a Roman numeral, and formulations obtained by ball milling and dry-sieving the coarse powders to separate particles which pass through or are retained on a screen having size openings of 106 micrometers are designated by a Roman numeral and the suffix A or B—A being used to denote a formulation having a particle size less than 106 micrometers, and B being used to denote a formulation having a particle size larger than 106 micrometers.

EXAMPLE VI

Part A

Preparation of Formulation I

A mixture of 14.4g of Polysilazane A and 3.8g of Polysilazane C in 280g of anhydrous toluene was stirred magnetically for about 30 minutes to obtain a homogeneous solution, after which 42g of SiC-1 powder was added to the solution. The mixture was ultrasonicated for about one hour to disperse the SiC powder, and the majority of the toluene was then flashed off to provide a non-flowing gray residue. The residue was dried under high vacuum for several days and then pulverized lightly with a mortar/pestle to obtain a free-flowing formulation powder which was designated as Formulation I.

Part B

Preparation of Formulations I-A and I-B

Formulation I was ball milled for about one hour with about 200 cc of silicon carbide milling balls having a diameter of about 0.25 inch in a 2.5-pint mill jar, after which the milling balls were removed. The milled powder was then dry-sieved through two screens having size openings of 250 micrometers and 106 micrometers to isolate two fractions—about 30g of powder that passed through both screens (Formulation I-A) and about 20g of powder that passed through the screen having the larger size openings but was retained on the screen having the smaller size openings (Formulation I-B).

EXAMPLE VII

Preparation of Additional Formulations

The general procedures of Example VI, Part A, i.e., slurry-blending, ultrasonicating, drying, and coarse-grinding, were used to prepare additional formulations having the compositions shown in Table I. The dispersant included in the formulations was a commercial polyisobutenyl succinimide dispersant.

TABLE I

| Formulation | Ingredient | Parts |
|---|---|---|
| II | Polysilazane A | 24 |
|  | Polysilazane C | 6 |
|  | SiC-2 | 70 |
|  | Dispersant | 0.5 |
| III | Polysilazane A | 24 |
|  | Polysilazane C | 6 |
|  | SiC-1 | 70 |
|  | Dispersant | 0.5 |
| IV | Polysilazane A | 24 |
|  | Polysilazane C | 6 |
|  | SiC-2 | 70 |
|  | Dispersant | 0.5 |
| V | Polysilazane B | 12 |
|  | Polysilazane D | 3 |
|  | SiC-2 | 85 |
|  | Dispersant | 0.5 |
| VI | Polysilazane B | 16 |
|  | Polysilazane D | 4 |
|  | SiC-2 | 80 |
|  | Dispersant | 0.5 |
| VII | Polysilazane B | 24 |
|  | Polysilazane D | 6 |
|  | SiC-2 | 70 |
|  | Dispersant | 0.5 |
| VIII | Polysilazane B | 28 |
|  | Polysilazane D | 7 |
|  | SiC-2 | 65 |
|  | Dispersant | 0.5 |
| IX | Polysilazane B | 24 |
|  | Polysilazane C | 6 |
|  | SiC-3 | 70 |
|  | Dispersant | 0.5 |
| X | Polysilazane A | 24 |
|  | Polysilazane C | 6 |
|  | SiC-2 | 70 |
|  | Dispersant | 0.5 |

When an A or B formulation was desired, i.e., a formulation having a particle size less or greater than 106 micrometers, the formulation was prepared by ball-milling and dry-sieving the basic formulation.

EXAMPLE VIII

Molding of Formulation I-A

Each of six green discs having a nominal diameter of 12.7 mm and a nominal thickness of 2.54 mm was molded from Formulation I-A. In the preparation of each of these discs, about 0.8g of the formulation was loaded into a suitable mold in a nitrogen glovebox; and the mold was evacuated to less than about 133 pascals, sealed under vacuum, transported to a hydraulic press, reconnected to a vacuum line, and evacuated to a pressure of not more than about 67 pascals—a vacuum level that was maintained throughout the remainder of the molding process. The evacuated mold was placed on the press platen, which was preheated to about 182° C. and allowed to preheat for 10 minutes, after which a force of 2268-2722 kg (175,817-210,981 kPa pressure) was applied to the mold and maintained for about five minutes. After compression, the mold was sealed under vacuum and transported back into the glovebox, where it was allowed to cool for about five minutes. After cooling, the molded green disc was removed from the mold and stored in the glovebox. The density was determined to be 2.05 g/cc.

EXAMPLE IX

Molding of Formulation I-B

Each of six green discs was prepared by repeating Example VIII except for substituting Formulation I-B for Formulation I-A. The density of the molded green discs was determined to be 2.05 g/cc.

EXAMPLE X

Pyrolysis of Formulations I-A and I-B

The green discs prepared in Examples VIII and IX were pyrolyzed in a nitrogen atomsphere by heating them to 1300° C. at rates of 60° C./hour from room temperature to 60° C., 30° C./hour from 60° C. to 260° C., 120° C./hour from 260° C. to 1260° C., and 60° C./hour from 1260° C. to 1300° C., maintaining the temperature at 1300° C. for one hour, cooling to 900° C. at a rate of −120° C./hour, and allowing ambient-rate cooldown from 900° C. to about room temperature, i.e., shutting down the furnace heaters when the temperature reached 900° C. and allowing the resultant furnace conditions to determine the rate of the remainder of the cooldown. After the pyrolyzed specimens had cooled to below 100° C., they were removed from the furnace and stored immediately in a dry nitrogen atmosphere. Their densities were calculated from weight and dimension data to be 2.32 g/cc and 2.33 g/cc for discs derived from Formulations I-A and I-B, respectively. All of the disc specimens underwent uniform, linear shrinkage of about 6% as a result of the pyrolysis.

The pyrolyzed specimens were subsequently stored in air at ambient temperature and humidity for several weeks, during which time their weight increased by 2-3%—the maximum weight gain having been reached in about seven days. After the specimens had equilibrated to constant weight, their bending strengths were determined by the biaxial-loading-stress method described in Godfrey, *Materials Science & Technology*, Vol. 1, No. 7 (1985), pp. 510–515. The discs formed from Formulation I-A were determined to have an average bending strength of 33.3 kg/mm$^2$, while hose formed from Formulation I-B had an average bending strength of only 21.4 kg/mm$^2$. Thus, the discs formed from Formulation I-A had an average specific strength of 14.4 (kg/mm$^2$)/(g/cc), while those formed from Formulation I-B had an average specific strength of only 9.2.

EXAMPLE XI

Determination of Particle Size Effect

About six green discs were molded from each of Formulations II, II-A, II-B, III, III-A, III-B, IV, IV-A, and IV-B essentially as in Example VIII, and the green discs were pyrolyzed essentially as in Example X except that the entire cooldown from 1300° C. was conducted at the ambient rate. The pyrolyzed disc specimens were equilibrated in ordinary air, after which their bending strengths were determined as in Example X. The densities, average bending strengths, and average specific strengths of the discs formed from the various formulations are shown in Table II.

TABLE II

| Formulation | Density (g/cc) | Bending Strength (kg/mm$^2$) | Specific Strength (kg/mm$^2$)/(g/cc) |
|---|---|---|---|
| II | 2.24 | 27.7 | 12.4 |
| II-A | 2.24 | 31.8 | 14.2 |
| II-B | 2.25 | 24.9 | 11.1 |
| III | 2.30 | 31.5 | 13.7 |
| III-A | 2.31 | 32.9 | 14.3 |
| III-B | 2.31 | 30.0 | 12.9 |
| IV | 2.26 | 26.6 | 11.8 |
| IV-A | 2.26 | 31.1 | 13.8 |

TABLE II-continued

| Formulation | Density (g/cc) | Bending Strength (kg/mm$^2$) | Specific Strength (kg/mm$^2$)/(g/cc) |
| --- | --- | --- | --- |
| IV-B | 2.26 | 21.9 | 9.7 |

EXAMPLE XII

Determination of Ingredient Ratio Effect

Six test specimens were formed from each of Formulations V-A, VI-A, VII-A, and VIII-A by the molding procedure of Example VIII and the pyrolysis procedure of Example X, equilibrated in air, and tested for bending strength as in Example X; and a duplicate run was made on Formulation VII-A. The as-pyrolyzed densities and average bending strengths of the specimens are shown in Table III.

TABLE III

| Formulation | Density (g/cc) | Bending Strength (kg/mm$^2$) |
| --- | --- | --- |
| V-A | 2.21 | 22.3 |
| VI-A | 2.28 | 27.1 |
| VII-A | 2.26 | 30.7 |
| VII-A | 2.26 | 27.9 |
| VIII-A | 2.23 | 26.2 |

EXAMPLE XIII

Determination of SiC Particle Size Effect

To determine if the particle size of the SiC starting material had an effect on the strength of pyrolyzed specimens, Formulation IX-A was molded into green disc specimens as in Example VIII and pyrolyzed as in Example X except that the heating rate from 60° C. to 260° C. was reduced to 15° C./hour, after which the pyrolyzed discs were equilibrated in air and tested for bending strength as in Example X. The SiC ceramic discs had an as-pyrolyzed density of about 2.12 g/cc and an average bending strength of 17.6 kg/mm$^2$—a strength high enough to make them useful but not as high as the strengths of ceramics derived from formulations containing SiC powders of a smaller particle size.

EXAMPLE IX

Determination of Effect of Degassing

Six green discs of Formulation X-A were compression molded as in Example VIII, and another six discs were molded from the same formulation under the same conditions except that no vacuum was applied to the mold prior to and during compression of the formulation powder. (Instead, the mold was sealed under dry nitrogen atmosphere and left sealed during compression.) The molded specimens were pyrolyzed, equilibrated in air, and tested for bending strength as in Example X. The SiC ceramics made from the green discs that were vacuum degassed prior to and during compression molding had an as-pyrolyzed density of 2.27 g/cc and an average bending strength of 25.2 kg/mm$^2$, while the discs that were not vacuum degassed had an as-pyrolyzed density of 2.28 g/cc and an average bending strength of 17.4 kg/mm$^2$.

It is obvious that many variations can be made in the products and processes set forth above without departing from the spirit and scope of this invention.

What is claimed is:

1. A preceramic composition having a particle size not larger than about 105 micrometers and comprising an intimate mixture of (A) about 50-85% by weight of SiC powder and (B) about 15-50% by weight of a preceramic solid polysilazane binder.

2. The composition of claim 1 wherein the SiC powder has a substantially spherical particle shape and a mean particle size of about 0.2-1.0 micrometer.

3. The composition of claim 1 wherein the binder consists essentially of at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

4. The composition of claim 3 wherein the organodihalosilane is methyldichlorosilane, the basic catalyst is KH, and the quenching reagent is methyl iodide.

5. The composition of claim 3 wherein the organodihalosilane is methyldichlorosilane, the basic catalyst is KH, and the quenching reagent is dimethylchlorosilane.

6. The composition of claim 1 wherein the binder has an alkali metal content of 0-100 ppm.

7. The composition of claim 1 wherein the binder content is about 20-30% by weight.

8. The composition of claim 1 comprising an intimate mixture of (A) about 70-80% by weight of SiC powder having a substantially spherical particle shape and a mean particle size of about 0.2-1.0 micrometer and (B) about 20-30% by weight of a preceramic polysilazane binder which (1) has an alkali metal content of 0-5 ppm and (2) consists essentially of at least one polysilazane prepared by reacting methyldichlorosilane with ammonia, treating the ammonolysis product with KH, and quenching the resultant product with methyl iodide or dimethylchlorosilane.

9. A process which comprises intimately mixing about 50-85% by weight of SiC powder with about 15-50% by weight of a preceramic solid polysilazane binder, pulverizing the mixture to form particles having a particle size smaller than 105 micrometers, and separating from those particles any particles having a particle size larger than about 105 micrometers.

10. The process of claim 9 wherein the SiC powder is dispersed in an organic solvent solution of the binder, the solvent is removed, and the resultant chunks of powder/binder are ball milled and then sieved to form an intimate powder/binder mixture having a particle size not larger than about 105 micrometers.

11. The process of claim 9 wherein the binder consists essentially of at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

12. The proces of claim 9 wherein about 70-80% by weight of the SiC powder is mixed with about 20-30% by weight of the binder.

* * * * *